United States Patent [19]
Bodde

[11] 3,804,308
[45]*Apr. 16, 1974

[54] SPARE TIRE MOUNTING ASSEMBLY

[76] Inventor: Egbert J. Bodde, Route 1, Trego, Wis. 54888

[*] Notice: The portion of the term of this patent subsequent to Aug. 21, 1990, has been disclaimed.

[22] Filed: Sept. 25, 1972

[21] Appl. No.: 291,740

[52] U.S. Cl............ 224/42.06, 214/453, 224/42.21
[51] Int. Cl............................................ B62d 43/02
[58] Field of Search............ 224/42.21, 42.06, 42.08, 224/42.12, 42.13, 42.24, 42.28, 42.29; 214/451, 453, 454, 452, 450

[56] References Cited
UNITED STATES PATENTS

| 3,326,434 | 6/1967 | Cheadle | 224/42.21 |
| 3,398,846 | 8/1968 | Ragan et al. | 224/42.21 X |
| 3,655,220 | 4/1972 | Rodgers | 214/454 X |
| 3,371,832 | 3/1968 | Kenro Sekino et al. | 224/42.21 |

Primary Examiner—Robert G. Sheridan
Assistant Examiner—Jerold M. Forsberg
Attorney, Agent, or Firm—Schroeder, Siegfried, Ryan & Vidas

[57] ABSTRACT

A spare tire mounting assembly particularly suited for front mounting of a spare tire to a vehicle is provided. The mounting assembly includes double pivotal mounting for alternative storage of the spare tire in a central position adjacent the vehicle grill or along the side of the front fender of the vehicle.

7 Claims, 3 Drawing Figures

SPARE TIRE MOUNTING ASSEMBLY

The present invention is related to my earlier filed copending patent application entitled TWO-POSITION SPARE TIRE MOUNTING ASSEMBLY, Ser. No. 185,149, filed Sept. 30, 1971, now U.S. Pat. No. 3,753,520. In that earlier patent application there is described and claimed a spare tire mounting assembly for the alternative storage of a spare tire extenal to the vehicle either on one end of the vehicle or by means of a plurality of pivots storing the spare tire parallel to and along one side of the vehicle.

In many types of vehicles, and in particular vehicles used for recreational purposes, the spare tire is positioned external to the vehicle and in a position so as not to interfere with the opening of a tailgate. External storage of the spare tire saves space within the cargo and passenger compartment of the vehicle. In the majority of such prior art arrangements the tire occupies a position beneath the rear of the vehicle to ride parallel to the roadbed or is stored by means of a mounting rack in vertical position adjacent the center grill region of the front of the vehicle. Each of these storage positions has disadvantages. Storage beneath the vehicle makes removal of the spare tire, when it is needed, a cumbersome and difficult task and leaves the spare tire mounting arrangement subject to corrosion because of its position beneath the vehicle where salt and water from the road is driven against the bolts holding the spare tire. In the second storage position adjacent the central grill at the forward part of the vehicle the spare tire interferes with the free flow of air through the radiator thus tending to cause overheating of the vehicle. It is customary in the design of vehicles which are intended for such central positioning of the spare tire in front of the radiator to have an extra large radiator to aid in overcoming the overheating problem. However, in spite of such increased radiator size overheating due to blockage of the free flow of air by the spare tire still takes place when such vehicles are used under conditions of heavy loading and/or high outdoor temperatures.

The present invention constitutes an improvement over my earlier filed patent application identified above in several respects including its construction, which decreases costs, and because of the fewer moving parts which makes the spare tire mount less prone to malfunction.

While the present invention is usable on either the forward or the rear end of the vehicle it will be described with particular emphasis for a front mounting of the spare tire assembly for reasons which will become apparent. This should not be taken to mean that the unit will not function as a rear mounted unit. With certain types of vehicles it possesses advantages for such use.

IN THE DRAWINGS

Figure 1:
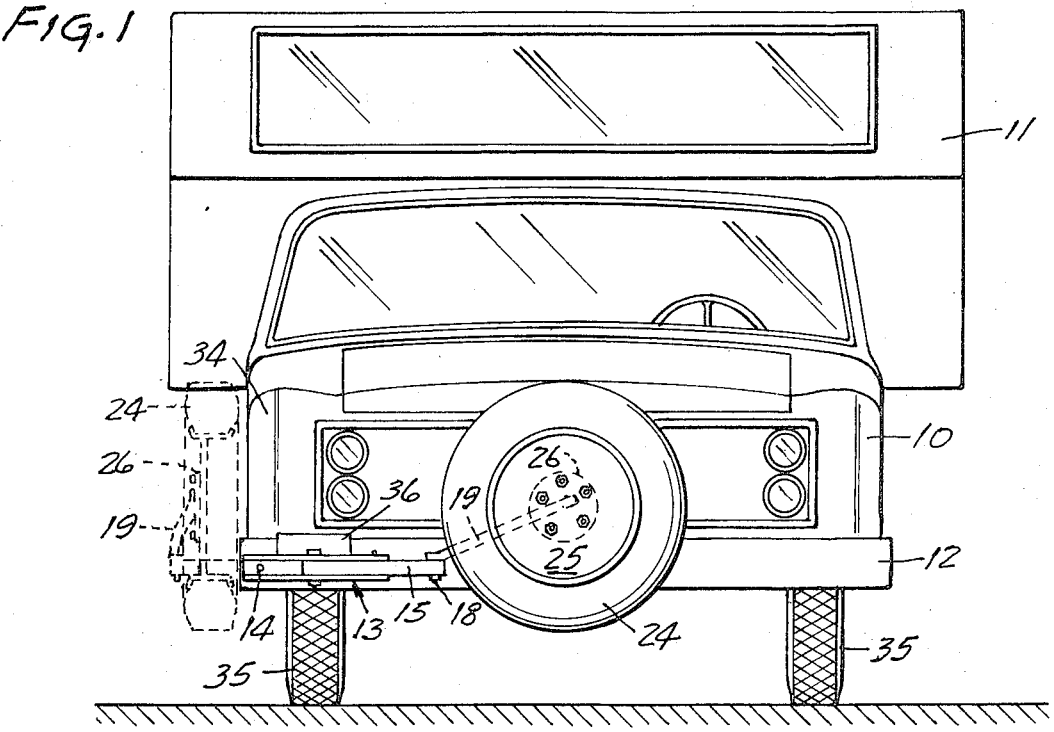
FIG. 1 is a front elevational view of a pickup truck and camper showing a spare tire mount in accordance with my invention positioned with the spare tire centrally located adjacent the grill of the vehicle and having in dotted outline the alternative storage position of the spare tire.

As already set forth above, it is desirable to store a spare tire externally to the vehicle to make for a larger amount of internal space for other purposes. It has been found quite cumbersome to store a spare tire for a recreational vehicle such as a truck camper beneath the near undercarriage portion as this makes the tire extremely difficult to remove and replace when a need arises for the spare tire. One common solution to this problem has been to store the spare tire by means of a spare tire mounting rack at a central position forward of the radiator and grill of the vehicle. While this solves the storage problem such positioning tends to interfere with the free flow of air to the radiator thus bringing about the overheating problems already noted.

Referring to the drawings wherein the same numerical designation will be given like parts in the several views, there is illustrated a pickup truck 10 having a camper 11 mounted into the rear bed of the truck. Such vehicles are well known and form no direct part of the invention herein although the invention is anticipated to find extensive use in connection with such vehicles. The vehicle 10 has a forward bumper 12 from which an assembly in accordance with the present invention is suspended. The assembly includes a channel-shaped mounting bracket generally designated 13 which is joined to bumper 12 by means such as bolts 14. A flange member 36 may be welded to channel 13 to hook over the upper edge of bumper 12 to give greater rigidity to the mounting of member 13. Pivotally suspended from bracket 13 by means of a pin 16 which passes through openings 37 in the sides of channel 13 is an arm 15. Pin 16 may be threaded at the lower end thereof to be joined to bracket 13 by means of a nut 17. At the opposite end of arm 15 from pivot connecting pin 16 is a second pivotal pin 18 to which is welded an angled arm 19. Pin 18 may be threaded as in the case of pin 16 to be engaged by a nut 20. Pin 18 passes slidably through opening 21 in arm 15 while pin 16 passes through opening 22 in arm 15.

Arm 19 is joined as by welding to the head of pin 18 and is at an obtuse angle of about 135° to the axis of pin 18. A bend 23 in arm 19 is provided for passage of arm 19 around the tire portion of the tire 24 and into the center part of rim 25. Joined to the end of arm 19 remote from pin 18 is a disc 26 provided with threaded lugs 27 positioned to cooperate with the bolt openings on a wheel rim 25. Arm 19 is mounted to provide at least 90° of rotation with respect to arm 15 and is restricted from completely free motion relative thereto by friction. A washer 28 of a material such as nylon may advantageously be used for a bearing surface and as the friction producing element.

Figure 2:
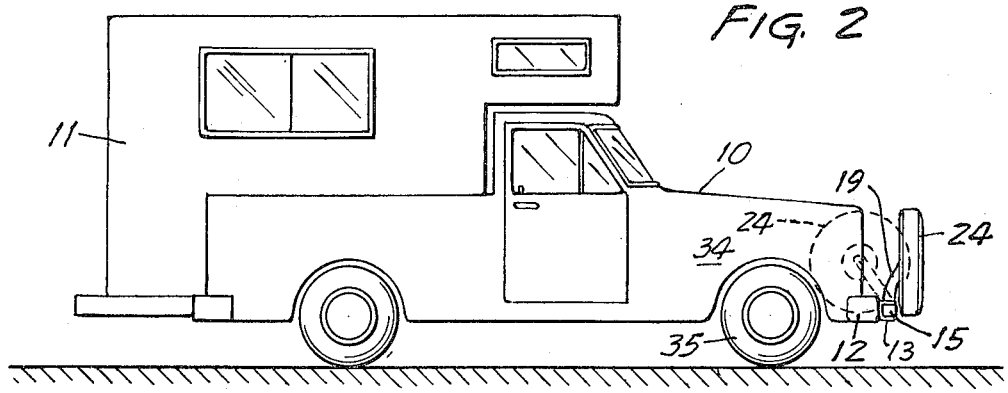
FIG. 2 is a side elevational view of the vehicle of FIG. 1 with the spare tire mounted in the alternative position adjacent the side of the forward portion of the vehicle; and, FIG. 3 is a perspective exploded view of the spare tire mounting assembly of the invention with the spare tire removed from the mount.
Figure 3:
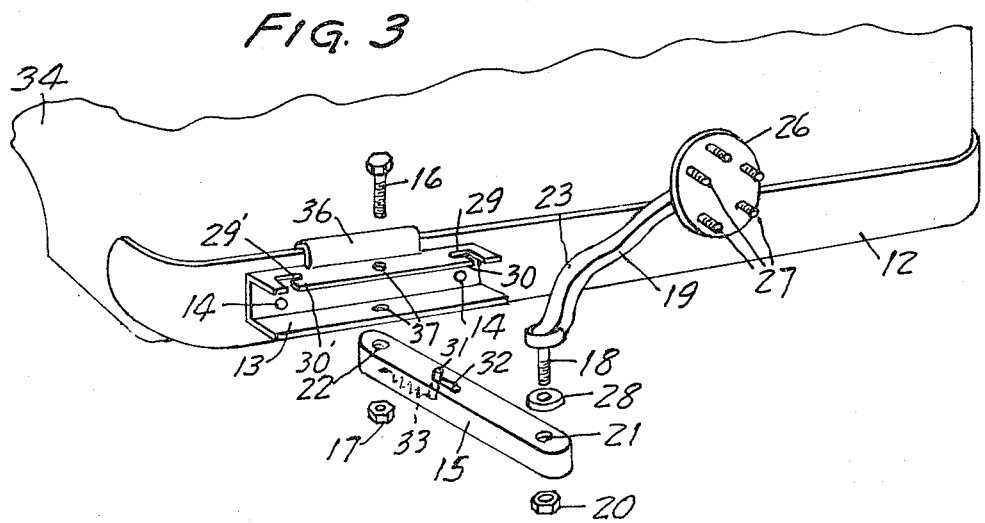

Each end of channel member 13 is provided with a slot portion 29 and 29' on the upper edge thereof which has an ear 30 and 30' adapted to restrict the motion of a pin 31 which is slidably mounted within a slot 32 in arm 15. Pin 31, slot 29 or 29' and ear 30 or 30' cooperate to form a latch for restricting movement of arm 15 from one of two fixed positions along bumper 12. Pin 31 is biased in the position shown in slot 32 by means such as spring 33. When it is desired to move the spare tire from a position adjacent the center portion of the grill over to the position along side the body of the truck as illustrated in FIG. 2 one presses against pin 31 biasing it along slot 32 until it is free to pivot outwardly from slot 29 around the edge of ear 30.

Operation of the spare tire mount of the invention should now be apparent. When the tire is to be positioned at the central part of the forward end of the vehicle, arm 15 is pivoted so as to have pin 31 in latched engagement with slot 29. In this position arm 19 is pivoted so as to be on substantially the same longitudinal line as the axis of arm 15. When it is desired to move spare tire 24 into the alternate storage position pin 31 is moved along slot 32 until it disengages from ear 30 and arm 15 is then rotated through approximately 180° until pin 31 engages slot 29 and becomes latched therein. The arm 19 is then rotated clockwise about a 90° turn and positions the spare tire along side the vehicle body as illustrated in FIG. 2. The angle of arm 19 with respect to arm 15 is determined to some degree by the extent of clearance between the forward part of the vehicle and the wheel well provided in the fender portion 34 so that on turning of the vehicle the wheel 35 will not come into contact with tire 24. In this alternate storage position along side of vehicle 10 the spare tire does not, of course, interfere with free flow of air to the radiator. Likewise, one has ready access to the forward portions of the engine compartment for routine maintenance and the like when the tire is stored along side the right or left front fender thereof as suits the desire of the owner of the vehicle. When the vehicle is in the parked condition the spare tire may be moved to either of the two extreme positions or merely left at an intermediate stage between the positions to facilitate maintenance work on the vehicle.

I claim:

1. A vehicle mountable two-position spare tire mounting assembly comprising:
   a. a first elongated supporting arm having a first and a second end portion;
   b. vehicle mounting means adapted to be fixedly joined to an end portion of said vehicle;
   c. first pivot means joining said first end portion of said supporting arm to said vehicle mounting means, to provide about 180° pivotal movement of said supporting arm about a generally vertical axis;
   d. a second supporting arm including a spare tire mounting bracket adjacent a first end thereof;
   e. second pivot means joining the second end of said second support arm to the second end of said first arm so that said second supporting arm has an obtuse angular relationship with respect to the plane of rotation of said first arm and is capable of pivotal movement of about 90° with respect to said first arm about a generally vertical axis; and,
   f. means for fixedly and releasably positioning said first arm at the extreme ends of its pivotal motion.

2. A spare tire mounting assembly in accordance with claim 1 wherein said second arm is angled at about 135° with respect to the plane of rotation of said first arm.

3. A spare tire mounting assembly in accordance with claim 1 wherein the second end of said second arm has a pin member extending downwardly therefrom at an obtuse angle, said pin being journaled through a vertically oriented opening in the second end of said first arm to form said second pivot means.

4. A spare tire mounting assembly in accordance with claim 3 wherein said obtuse angle is about 135°.

5. A spare tire mounting assembly in accordance with claim 1 wherein said vehicle mounting means is constructed and arranged to be mounted to a vehicle bumper.

6. A spare tire mount in accordance with claim 1 wherein said vehicle mounting means is a channel iron constructed and arranged to have the base of the U joined to the outward face of a vehicle bumper, the side portions of said U-shaped channel iron defining a pair of vertically aligned openings, said first end of said first arm defining an opening therethrough and a pin member passing through each of said openings to pivotally join said mounting means and said first arm.

7. A spare tire mount in accordance with claim 6 wherein one side of said U-shaped beam defines latch openings on opposite sides of said pivot and said first arm has a spring biased latch pin movably mounted thereto to define with said latch openings latches for releasably holding said first arm in one of its fixed positions.

* * * * *